(12) United States Patent
Molloy (10) Patent No.: US 8,671,241 B2
(45) Date of Patent: Mar. 11, 2014

(54) SYSTEMS AND METHODS FOR USING RESERVED SOLID STATE NONVOLATILE MEMORY STORAGE CAPACITY FOR SYSTEM REDUCED POWER STATE

(75) Inventor: Michael K. Molloy, Round Rock, TX (US)

(73) Assignee: Dell Products LP, Round Rock, TX (US)

( * ) Notice: Subject to any disclaimer, the term of this patent is extended or adjusted under 35 U.S.C. 154(b) by 219 days.

(21) Appl. No.: 13/231,504

(22) Filed: Sep. 13, 2011

(65) Prior Publication Data

US 2013/0067137 A1  Mar. 14, 2013

(51) Int. Cl.
*G06F 12/00* (2006.01)
(52) U.S. Cl.
USPC .................................. 711/103; 711/E12.008
(58) Field of Classification Search
USPC ......................................... 711/103, E12.008
See application file for complete search history.

(56) References Cited

U.S. PATENT DOCUMENTS

| 6,967,869 | B1 | 11/2005 | Kolokowsky |
| 7,904,635 | B2 * | 3/2011 | Deng et al. .................. 711/103 |
| 2009/0327608 | A1 | 12/2009 | Eschmann et al. |
| 2011/0078364 | A1 | 3/2011 | Lee et al. |
| 2011/0082987 | A1 | 4/2011 | Sauber et al. |
| 2011/0099320 | A1 | 4/2011 | Lucas et al. |

OTHER PUBLICATIONS

Super Talent, "SSD User Manual", Printed from Internet Jul. 29, 2011, 8 pgs.

\* cited by examiner

*Primary Examiner* — Mardochee Chery
(74) *Attorney, Agent, or Firm* — Egan, Peterman & Enders LLP (57) ABSTRACT

Systems and methods that may be implemented to utilize the same portion of solid state nonvolatile memory for both managing system running data during a system working state and to store previous working state data written from system volatile memory during a low power state when the system volatile memory is depowered. The previous working state information may include data and instructions that may be employed to restore the previous working state of the information handling system prior to entering the low power state and terminating power to the system volatile memory.

24 Claims, 8 Drawing Sheets

SYSTEMS AND METHODS FOR USING RESERVED SOLID STATE NONVOLATILE MEMORY STORAGE CAPACITY FOR SYSTEM REDUCED POWER STATE

TECHNICAL FIELD

This disclosure relates generally to information handling systems, and more particularly to storage of information during reduced system power state.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems (such as computer workstations, desktop computers and portable computers), often employ low power states and storage techniques that limit the amount of power consumed by the systems during periods of inactivity while maintaining the operating state (e.g., loaded applications and data) of the system. One example of such a technique is a reduced power state known as "suspend" (alternatively "sleep" or "standby"). During one type of conventional suspend state (i.e., Advanced Configuration and Power Interface "ACPI" S3 power state), information (e.g., data and instructions) required to maintain the last working operating state of the information handling system is maintained in powered dynamic random access volatile memory (DRAM). While in such a suspend state, power to other unneeded circuitry of the system is cut off until the machine is woken up again for use, at which time power is restored to the other components of the system and the saved operating state information maintained in the powered memory used to restore the information handling system to its last working operating state. Using this conventional suspend technique, power is consumed by the powered memory at all times while the system is in the suspend state. Additionally, some types of information handling systems, such as servers, do not currently support S3 (suspend to RAM) state.

Another type of conventional low power technique commonly refers to "hibernation" copies all information (e.g., data and instructions) required to maintain the last operating state of the information handling system from powered DRAM memory to a non-volatile storage disk so that power to the powered memory of the information handling system may be cut off together with power to the other system components during the hibernation state (ACPI S4 state). Saving information to a storage disk during the low power S4 hibernation state requires less power than storing this information in powered DRAM during the low power S3 suspend state. However, saving information to non-volatile storage disk during S4 hibernation state requires additional time for entering and recovering from the hibernation state, making these operations slower. Using such a hibernation technique also requires a disk drive to spin up and then be read to restore the last working state data to DRAM when restoring a system from a very low power state. This process can be very slow, as copying and restarting can take a relatively long time, especially for large DRAM systems like servers. To help speed recovery from S4 hibernation state, all working state DRAM contents (OS, applications and data) may be stored in fast non-volatile storage. Saving recovery data to flash memory of a solid state drive (SSD) during hibernation may be employed to further speed recovery from the suspend state, but requires a lot of additional storage space on the SSD to be allocated for this purpose, which increases storage expense for the system.

An SSD controller cannot write over an unerased flash memory block. Erasing cells on solid state flash memory to prepare put a flash memory block in a state that allows writing is several orders of magnitude slower than the act of writing to the flash memory block. Therefore, SSD controllers typically reserve about 20% to 50% of the total capacity of an enterprise SSD for "data garbage collection" (i.e., for accumulation of data that is no longer to be saved). At any given time, this reserved data garbage collection space is either already erased (i.e., making writing of new data fast) or is in the process of being erased. It does not contain any saved data. In this way, the reserved data garbage collection space eliminates the need for a write operation to go through an erase cycle before its data can be written to the SSD.

SUMMARY OF THE INVENTION

Disclosed herein are systems and methods that may be implemented to optimize solid state nonvolatile memory allocation between different operating modes of an information handling system. The disclosed systems and methods may be implemented to utilize the same portion of solid state nonvolatile memory for both managing system running data during a system working state and to store previous working state data written from system volatile memory during a low power state when the system volatile memory is depowered, e.g., during a hibernation state such as ACPI S4 state or other type of low power state. In particular, the disclosed systems and methods may be implemented to optimize storage of previous working state data on Flash memory or other type of solid state non-volatile memory which includes storing of previous working state information (e.g., data and instructions) during a low power state (e.g., such as hibernation state) of an information handling system, such as a server. This previous working state information may include data and instructions that may be employed to restore the previous working state of the information handling system prior to entering the low power (e.g., hibernation) state and terminating power to powered system volatile memory such as DRAM.

In one exemplary embodiment, a non-volatile memory controller may be configured to use the existing reserve space on a solid state non-volatile memory device to save previous working state information needed for recovery from a low power state operation (e.g., a S4 hibernation state operation) for an information handling system without competing for normal non-reserved memory space on the non-volatile memory device of the type that is used for data storage during a higher power working state of the information handling system. In this way, the reserved (data garbage collection) space of a non-volatile memory space may be efficiently used such that during a lower power (e.g., hibernation) state of the information handling the reserved memory space holds a copy of working state information read from powered volatile memory, and during a higher power system working state is erased or in the process of being pre-erased for improved performance (e.g., for "data garbage collection" purposes). Thus, in this embodiment there is no requirement to allocate or use non-reserved normal (non-data garbage collection) storage space on the non-volatile device during the low power (e.g., hibernation) state.

In one exemplary embodiment, a flash controller algorithm executed by a nonvolatile memory controller (e.g., flash controller) may be created, modified and/or extended so that it uses a reserved space of a non-volatile memory that is normally used for accumulation of data that is no longer to be saved during normal working system (e.g., ACPI S0) state, and that is consequently typically only visible to a data garbage collection or other similar function of the nonvolatile controller. Such a controller algorithm may be implemented during a S4 hibernation operation to store a copy of the system working state information corresponding to the information maintained in the powered system volatile memory (e.g., DRAM) during the previous system working state. This system working state information may include, for example, copies of the OS, applications, other data and instructions that were present in powered volatile memory prior to depowering this memory.

During a low power state such as S4 hibernation state, all input/output (I/O) activity will cease and there is no competing use for the reserved (e.g., data garbage collection) space of the non-volatile memory. Since most or substantially all of the reserved data garbage collection space is already erased, data writes from powered volatile memory (e.g., DRAM) for the low power state may be performed relatively quickly. In this regard, at the moment of entering hibernation state, the system working state information from the powered volatile memory may be copied to the reserved nonvolatile memory (e.g., SSD) space, and then the volatile memory depowered. Nonvolatile memory uses relatively low power when not accessed during the low power state, and the disclosed systems and methods may be configured so that a nonvolatile controller (together with other system components such as processor, volatile memory, etc.) also enters into a low power state during the low power state. Upon restoration of the system from the low power (e.g., S4 hibernation) state to a higher power state (e.g., S0 working state), the lower power state system components (e.g., such as volatile memory, processor, nonvolatile controller, etc.) enter a higher power state, and the reserved nonvolatile memory space is read back and copied into the repowered volatile memory. After system working state information in the reserved nonvolatile memory space has been read back to volatile memory, the nonvolatile controller may then start its erase cycles (including erasing the reserved nonvolatile memory space) in parallel to the power up operations of the rest of the information handling system.

In one exemplary embodiment, a reserved space write command (e.g., such as a "write to res space" command) may be employed when entering low power (e.g., S4 hibernation) state to cause disabling of any restriction that during higher power (e.g., S0 working) state prevents writing to the reserved (e.g., data garbage collection) space of the nonvolatile memory. This allows writing of the system working state information to the reserved nonvolatile memory space from powered volatile memory (e.g., DRAM) when the information handling system is entering the low power (e.g., S4 hibernation) state. The working state information may be written to write-to blocks of the reserved nonvolatile memory space that will not be managed and that are flagged for future erasing when a reserved space read command (e.g., such as a "read from reserve space" command) is executed during restoration of the system from the low power (e.g., S4 hibernation) state to higher power (e.g., S0 working) state.

By employing normally-reserved space of a solid state non-volatile memory device such as SSD, the disclosed systems and methods may be advantageously implemented to utilize solid state non-volatile memory space that is not allocated for saving data during higher power (e.g., S0 working) system state. Instead, such non-allocated (e.g., "data garbage collection") space may be temporarily used during a low power system state in which volatile memory is depowered (e.g., such as S4 hibernation state) for storing system working state information read from volatile memory in order to enable quick read-back of the data to the volatile date from the nonvolatile memory and thus quick recovery from the low power system state to a high power system state (e.g., S0 working state) where the system volatile memory is repowered. By then returning this non-allocated reserved nonvolatile memory space to its normal use (e.g., for "data garbage collection") upon system restoration to the higher powered state, little or no additional expensive solid state device memory space is required as compared to a conventional system configuration.

Advantageously, the disclosed systems and methods may be implemented in one exemplary embodiment using PCIe 3.0 speeds with ×4, such that 4 GBps may be the normal bandwidth of the interface. Further, with parallel flash organization, high bandwidth may be made available, e.g., in one example to suspend a 64 GB server in less than 1 minute. The disclosed systems and methods may also be employed in a variety of low power states, including for storing "ready" state information, e.g., for a large number of smaller servers that are in a "ready" state for execution (e.g., provisioned and booted) but in extremely low power state.

In one respect, disclosed herein is a method of storing information on solid state nonvolatile memory that includes providing an information handling system that itself includes solid state nonvolatile memory, and volatile memory configured to only store date when power is provided to the volatile memory. The method may further include: providing power to the volatile memory during the first working state of the information handling system; storing system working state information in the volatile memory while the information handling system is in the first working state with power provided to the volatile memory; allocating a first portion of the solid state nonvolatile memory for storage of saved data and reserving a second space of the solid state nonvolatile memory for data garbage collection during the first working state of the information handling system; depowering the volatile memory during a second lower power state of the information handling system with no power provided to the volatile memory; and writing the system working state information from the powered volatile memory to the reserved second space of the solid state nonvolatile memory for storage prior to depowering the volatile memory during the second lower power state of the information handling system in which no power is provided to the volatile memory.

In another respect, disclosed herein is an information handling system, including: solid state nonvolatile memory; volatile memory; and one or more processing devices. The one or more processing device may be configured to cause implementation of the following actions: provide power to the volatile memory during a first working state of the information handling system, store system working state information in the volatile memory while the information handling system is in the first working state with power provided to the volatile memory, allocate a first portion of the solid state nonvolatile memory for storage of saved data and reserve a second space of the solid state nonvolatile memory for data garbage collection during the first working state of the information handling system, depower the volatile memory during a second lower power state of the information handling system, and write the system working state information from the powered volatile memory to the reserved second space of the solid state nonvolatile memory for storage prior to depowering the volatile memory during the second lower power state of the information handling system in which no power is provided to the volatile memory.

DESCRIPTION OF ILLUSTRATIVE EMBODIMENTS

Figure 1:
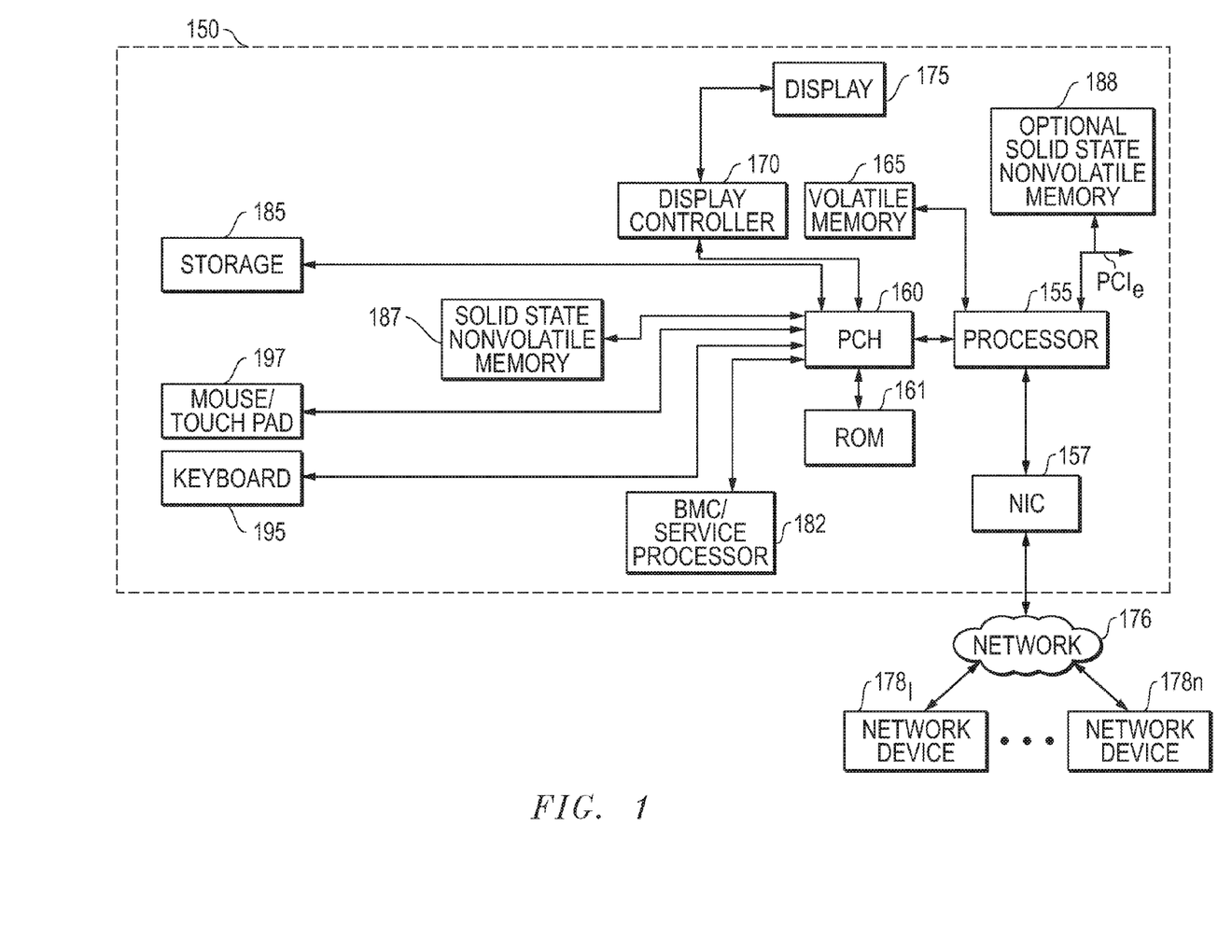
FIG. 1 illustrates a block diagram of an information handling system according to one exemplary embodiment of the disclosed systems and methods.

FIG. 1 is a block diagram of an information handling system 150 as it may be configured as a computer server system according to one exemplary embodiment of the disclosed systems. In this regard, it will be understood that the server configuration of FIG. 1 is exemplary only, and that the disclosed systems and methods may be implemented on any other type of information handling system (e.g., desktop computer, laptop computer, etc.) during a S4 hibernation or other type of lower power state with depowered memory to save previous working state information read from powered system volatile memory to system non-volatile memory so that the volatile memory may be depowered and the working state information retained for later read-back to the volatile memory when the system is recovered to a higher powered state and the volatile memory repowered.

As shown in FIG. 1, information handling system 150 of this exemplary embodiment includes at least one processing device 155, which may each be a central processing unit CPU (e.g., such as an Intel Pentium series processor, an Advanced Micro Devices (AMD) processor) or one of many other processors or other types of suitable processing devices configured to interpret and/or execute program instructions and/or process data. In some embodiments, processing device 155 may interpret and/or execute program instructions and/or process data stored in system volatile memory 165, storage media 185 and/or another component of information handling system 150. System powered volatile memory 165 (e.g., dynamic random access memory DRAM) may be coupled as shown to processing device 155 via platform controller hub (PCH) 160 which facilitates input/output functions for the information handling system. System read only memory (ROM) 161 (e.g., such as erasable programmable read only memory "EPROM", electrically erasable programmable read only memory "EEPROM", etc.) is also provided as shown for storing start up firmware, such as system BIOS. Also shown coupled to processing device 155 for this server embodiment is network interface card (NIC) 157 that is provided to enable communication across network 176 (e.g., such as the Internet or local corporate intranet) with various multiple information handling systems configured as network devices $178_1$-$178_n$.

Still referring to FIG. 1, storage 185 may include storage media drives 185 (e.g., hard disk drives, NVRAM, Flash or other suitable media drive devices) or any other suitable form of internal or external storage that may be coupled to PCH 160 and its controller chip to provide permanent storage for the information handling system. One or more input devices (e.g., keyboard 195, mouse/touchpad 197, etc.) and a display device 175 (e.g., LCD display) together with its corresponding display controller 170 may be optionally coupled to PCH 160 and its controller chip to enable the user to interact with the information handling system 150 and programs or other software/firmware executing thereon. As further shown, the exemplary information handling system 150 of this embodiment may also include a service processor 182 (e.g., such as baseboard management controller "BMC") running system BIOS may also be coupled to PCH 160 and its controller chip as shown. Service processor 182 may be, for example, running real time OS or embedded Linux and also performing tasks independent of the host and BIOS, such as cooling fan control, etc. It will be understood that the particular combination of information handling system components of FIG. 1 is exemplary only, and that the disclosed systems and methods may be implemented with an information handling system that includes any other suitable combination of additional, fewer or alternative information handling system components (e.g., including one or more processing devices).

As further shown in FIG. 1, PCH 160 may be communicatively coupled to solid state nonvolatile memory 187, for example, via high speed bus such as a PCIe interface. Further, optional additional solid state nonvolatile memory 188 may be directly coupled as shown to processing device 155, e.g., via PCIe interface. Solid state nonvolatile memory 187 and/or 188 may include, for example, fast nonvolatile memory such as flash memory, PCIe flash memory (including nonvolatile memory E "NVME"), NVDIMMs (nonvolatile dual in-line memory modules), a PCIe (Peripheral Component Interconnect Express) add-in-card, a direct connect nonvolatile interface (e.g., an ONFI (Open NAND Flash Interface Working Group) interface), a SSD (solid-state drive), or another solid state storage type configured for fast restart.

In the embodiment of FIG. 1, PCH 160 may be coupled to other components with optional interfaces such as a PCIe interface and device interfaces such as a USB (Universal Serial Bus) interface, for example. It will be understood that non-volatile memory 187 and/or 188 may be configured as an integral component within a chassis of information handling system 150 (e.g., internal SDD, board mounted NVRAM, etc.), or may be alternatively configured as an attached external memory device. Moreover, although separate storage media 185, non-volatile memory 187 and nonvolatile memory 188 are shown provided in the embodiment of FIG. 1, it will be understood that a common non-volatile memory device/s may be alternatively employed to perform functions of both storage media 185 and non-volatile memory 187, 188 that are described herein.

Figure 2:
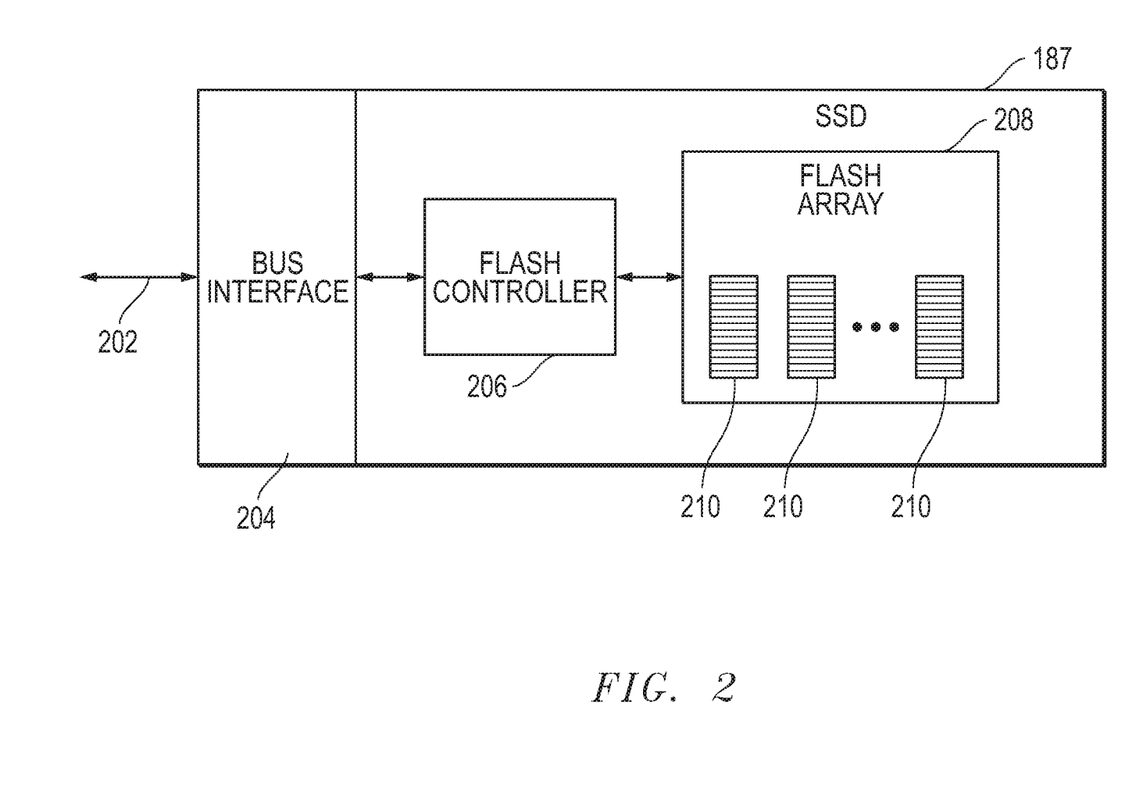
FIG. 2 illustrates a solid state nonvolatile memory according to one exemplary embodiment of the disclosed systems and methods.

FIG. 2 illustrates one exemplary embodiment of solid state nonvolatile memory 187 that is configured as a solid state drive (SDD) to store information during operation of information handling system 150. It will be understood that one or more features and tasks of nonvolatile memory 187 may be alternatively implemented using nonvolatile memory 188 when present. In the embodiment of FIG. 2, SSD 187 includes an array 208 of nonvolatile memory (Flash) memory elements 210 to which saved data is written to and read back across data bus 202 (e.g., high speed PCIe 3.0 bus or other suitable data bus such as serial advanced technology attachment "SATA", serial attached SCSI "SAS", etc.) via bus interface 204. As shown, a nonvolatile memory (Flash) controller 206 (e.g., any suitable processing device such as microprocessor, microcontroller, ASIC, FPGA, etc.) is provided to control reads to and writes from the flash memory elements 210 of array 208. Nonvolatile memory controller 206 may be configured to reserve at least a portion of the nonvolatile memory space (e.g. about 20% to 50% of the total capacity flash memory elements 210) as a "data garbage collection" space for accumulation of data that is no longer to be saved to nonvolatile memory 187 during higher power system operation when volatile memory 165 is powered (e.g., during ACPI system working state S0). At any given time during system working state, this reserved data garbage space is either already erased (i.e., making writing of new data fast) or is in the process of being erased, and does not contain any saved data. It will be understood that this configuration of nonvolatile memory 187 is exemplary only, and that any other suitable configuration of one or more nonvolatile memory elements and/or one or more processing devices may be employed.

Figure 3:
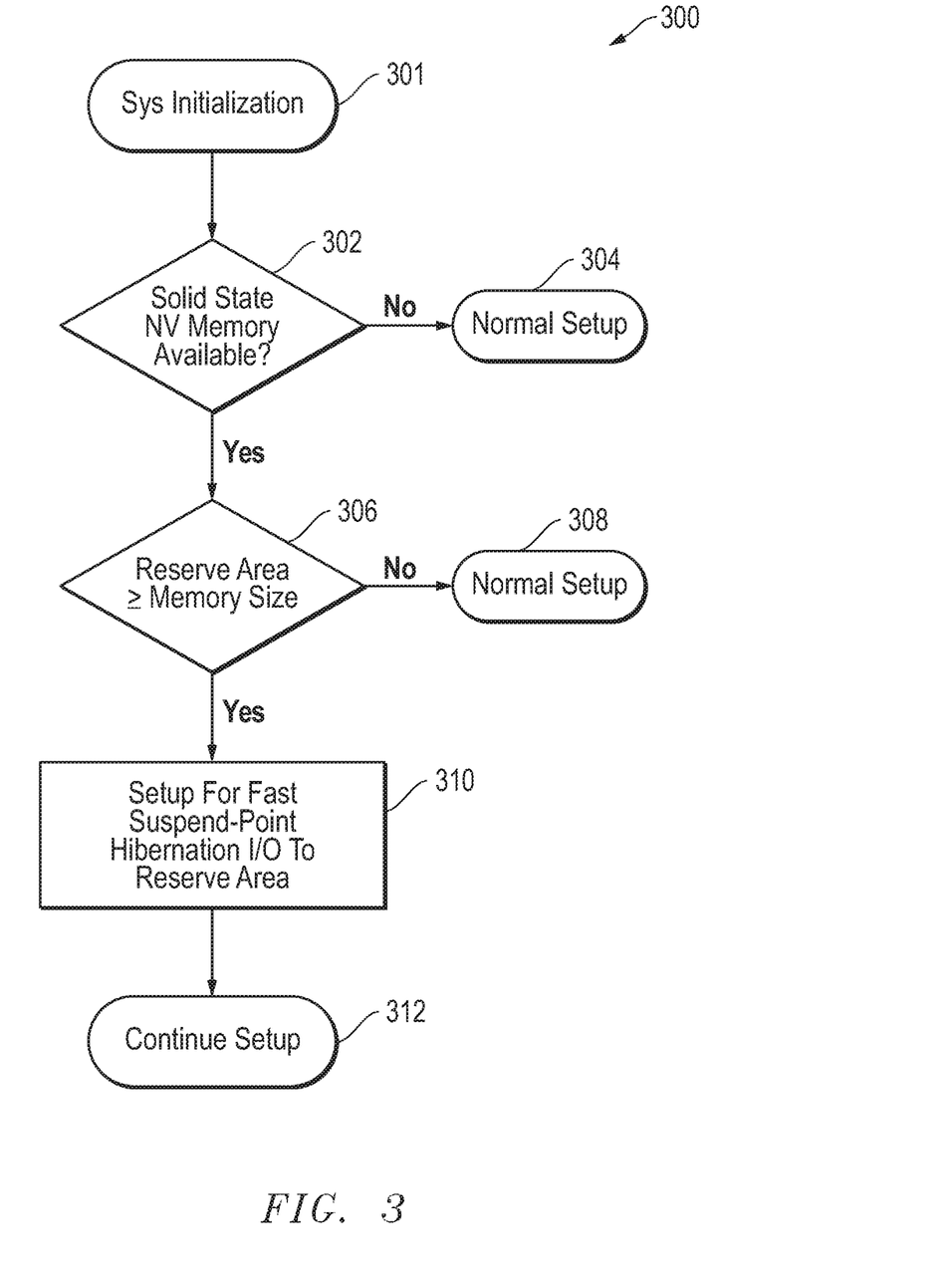
FIG. 3 illustrates methodology according to one exemplary embodiment of the disclosed systems and methods.

FIG. 3 illustrates fast hibernation setup methodology 300 that may be employed in one exemplary embodiment during system initialization and boot up of information handling system 150. The steps of methodology 300 may be performed by, for example, processor 155 of information handling system 150 executing start up code stored on system ROM 161. As shown in FIG. 3, system initialization begins in step 301 and proceeds to step 302 where it is determined if solid state nonvolatile memory 187 is available. If no solid state nonvolatile memory is found available in step 302, then methodology 300 proceeds with normal system configuration and operating system setup in step 304, e.g., including setting up system configuration to save previous operating state information in powered volatile memory 165 during a hibernation or other low power state. However, if solid state nonvolatile memory 187 is found present, then methodology 300 proceeds to step 306 where it is determined if the size of the reserved (e.g., data garbage collection) space of solid state nonvolatile memory 187 is at least as large as the size of volatile memory 165. If the size of the reserved space of solid state nonvolatile memory 187 is not as large as the size of volatile memory 165, then methodology 300 proceeds with normal system configuration and operating system setup in step 308, in a manner similar to step 304. However, if the size of the reserved space of solid state nonvolatile memory 187 is at least as large as the size of volatile memory 165, then methodology 300 proceeds to step 310, where the system is enabled for fast hibernation to nonvolatile memory 187 by pointing the hibernation input/output (I/O) operations of the operating system (e.g., Linux, Windows, etc.) to the reserved (e.g., data garbage collection) space of solid state nonvolatile memory 187, it being understood that another mechanism besides the operating system (e.g., such as system BIOS) may be employed to create and use memory area in the reserved space of solid state nonvolatile memory 187 to store working state information. System setup continues in step 312.

Figure 4:
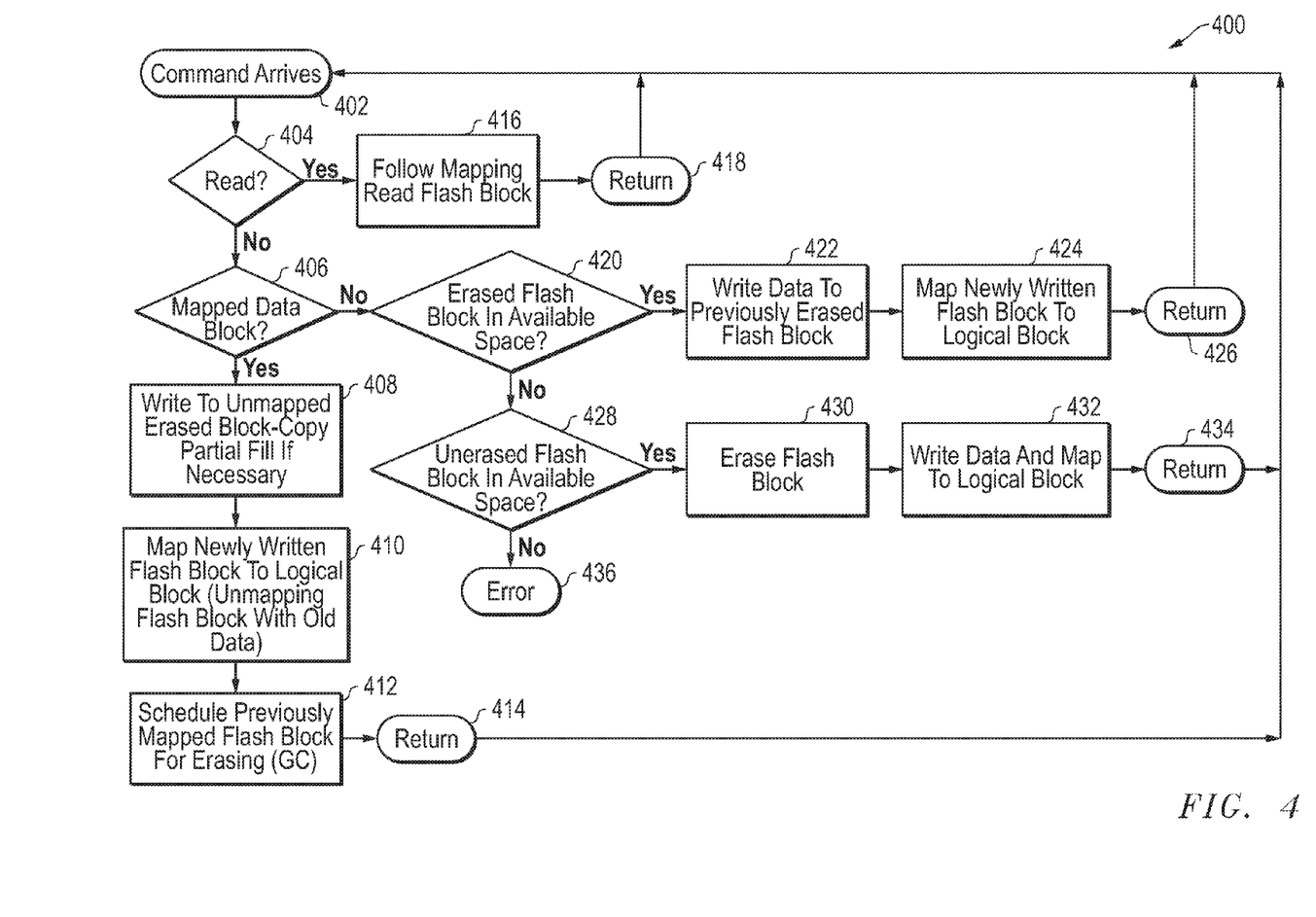
FIG. 4 illustrates methodology according to one exemplary embodiment of the disclosed systems and methods.

FIG. 4 illustrates one exemplary embodiment of operating management methodology 400 of a solid state nonvolatile memory (e.g., such as solid state nonvolatile memory 187 of information handling system 150) that may be executed (e.g., by nonvolatile memory controller 206 of FIG. 2) during a system operation state in which system volatile memory (e.g., volatile memory 165) is powered. An example of such a system operation state is ACPI working state S0, during which the memory controller 206 allocates a first portion of memory space of nonvolatile memory 187 for saved data, and utilizes a second memory space as reserved (e.g., data garbage collection) space that contains erased memory space and memory space that holds non-saved data that is in the process of being pre-erased. Although described in relation to operation of solid state nonvolatile memory 187 (e.g., Flash memory), it will be understood that methodology 400 may be alternatively implemented by any solid state nonvolatile memory configuration that is suitable for coupling to an information handling system for purposes of reading, writing, and erasing data therefrom.

As shown, methodology 400 starts in step 402 where a command arrives across bus 202 at memory controller 206 from processor 155. If the command is determined to be a read command for a given mapped memory block in step 404, then the memory controller 206 follows the mapping of memory array 208 to read the block in step 416, and then returns to read another command in step 402. However, if the command is not a read command (i.e., it is a write command) then methodology 400 proceeds to step 406, where it is determined if the write command data corresponds to a previously mapped data block of memory array 208. If the write command data corresponds to a logically mapped data block of memory array 208, then the new data for the block is written in step 408 to a new unmapped and erased data block of memory array 208 (copying partial fill if necessary). In step 410, the newly written data block of the memory array is mapped to the corresponding logical block, and the previously mapped data block of memory array 208 (i.e., containing old data corresponding to the same logical block) is unmapped. The previously mapped data block is scheduled in step 412 for erasing, and methodology 400 returns in step 414 to read another command in step 402.

If in step 406, the write command data does not correspond to a logically mapped data block of memory array 208, then it is determined step 420 if an erased block is present in the available (i.e., non-reserved) space of memory array 208. If an erased block is found to be present in available space of memory array 208, then the new data is written to this previously erased block in step 422, and then mapped to the corresponding logical block in step 424 before methodology 400 returns in step 426 to read another command in step 402. However, if in step 420 it is determined step that an erased block is not present in the available space of memory array 208, then it is determined in step 428 if an un-erased memory block is present in the available space of memory array 208. If such an un-erased memory block is found present in the available space of memory array 208, then this block is erased in step 430. The new data is written to this previously erased block in step 432 and mapped to the corresponding logical block before methodology 400 returns in step 434 to read another command in step 402. If in step 428 no un-erased memory block is found present in the available space of memory array 208, then methodology 400 terminates in step 436 with an error. This error may be, for example, passed back to the operating system for handling as a normal I/O error, e.g., similar to a disk write failure error. Depending on the data being written, the step 436 may be executed to result in the error being passed back to an application to decide what to do, or if the operating system was doing a page out, it can decide a course of action.

Figure 7:
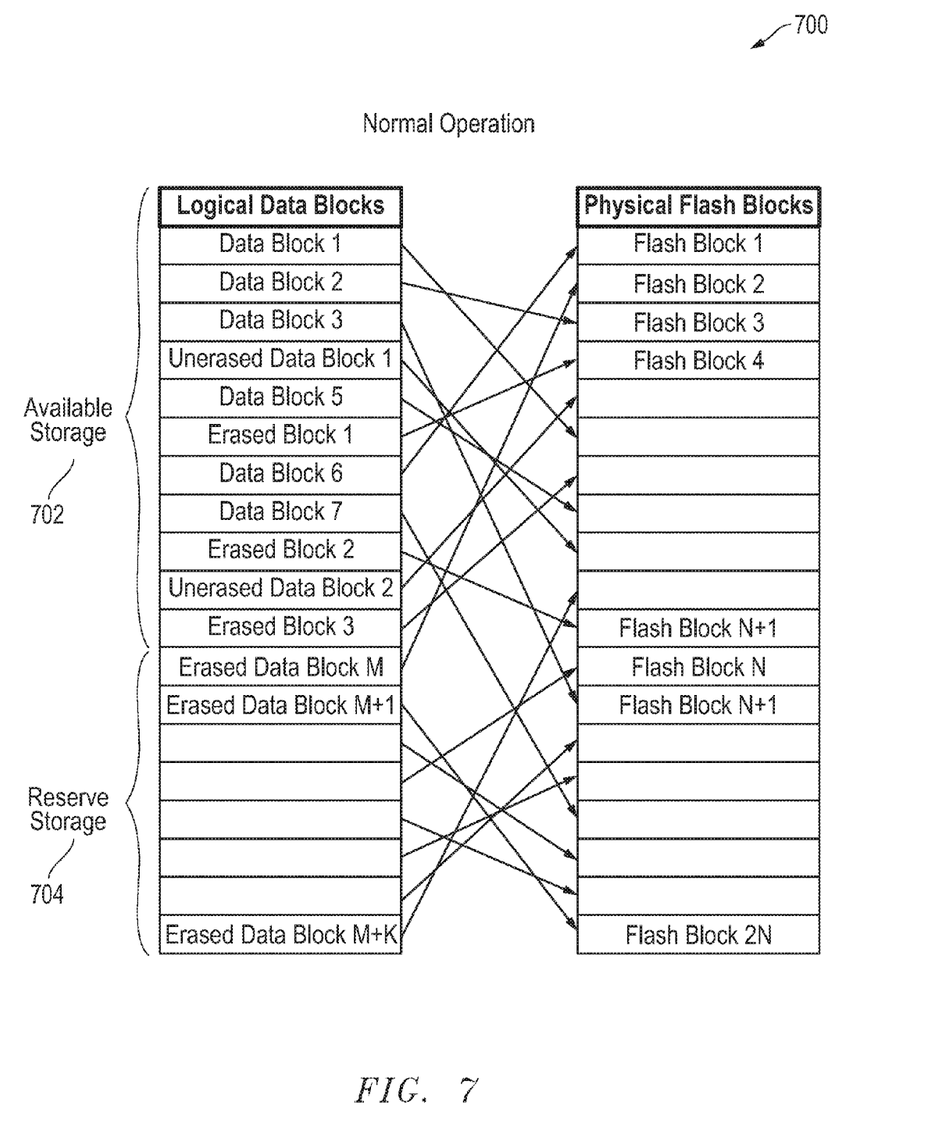
FIG. 7 illustrates a mapping relationship according to one exemplary embodiment of the disclosed systems and methods.

FIG. 7 illustrates one exemplary embodiment of a mapping relationship 700 of logical memory blocks to physical memory blocks that may be implemented by a nonvolatile memory controller (e.g., such as nonvolatile memory controller 206) during higher power normal operation of solid state nonvolatile memory (e.g., during S0 power state), such as described above in relation to FIG. 4. As shown in FIG. 7, a relatively large percentage (e.g., about 40%) of the logical memory blocks are assigned to reserved (data garbage collection) storage space 704 and are mapped to physical memory blocks of the nonvolatile storage that are maintained in pre-erased condition during a higher power (e.g., S0 working) system state. The remainder of the logical memory blocks are assigned to active available storage space 702 that is allocated for saved data and mapped to physical memory blocks that contain saved data or that are ready to contain saved data.

Figure 5:
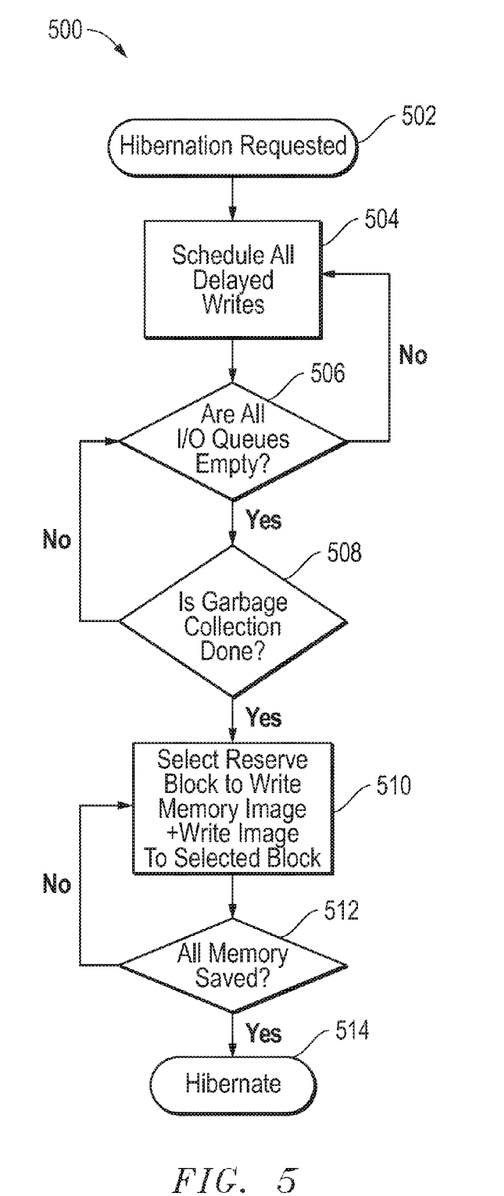
FIG. 5 illustrates methodology according to one exemplary embodiment of the disclosed systems and methods.
Figure 6:
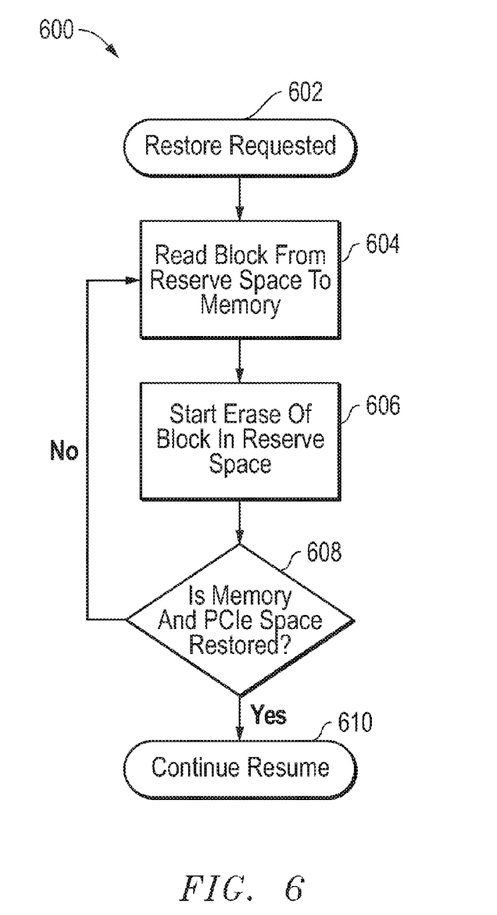
FIG. 6 illustrates methodology according to one exemplary embodiment of the disclosed systems and methods.

FIGS. 5 and 6 respectively illustrate hibernate and restore methodologies 500 and 600 as these operations may be implemented (e.g., by nonvolatile memory controller 206 of solid state nonvolatile memory 187) with direct use of the reserve (data garbage collection) space of solid state nonvolatile memory without remapping and by using immediate erase of the reserve space of the solid state nonvolatile memory. It will be understood, however, that in an alternate embodiment hibernate and restore operations may be conducted in any other suitable manner including, for example, such that the management of the reserved solid state memory space for the data garbage collection process may be performed asynchronously.

Hibernation storage methodology 500 of FIG. 5 may be implemented to store working state information prior to entering a hibernation (e.g., S4) power state or other power state in which powered volatile system memory is depowered. As shown, methodology 500 starts in step 502 where a hibernation write request is received (e.g., from BIOS executing on processor 155) at the initiation of a hibernation state (S4 power state) for information handling system 150. Prior to proceeding, all delayed writes for solid state nonvolatile memory 187 are scheduled in step 504. Next, methodology 500 does not proceed further until all input/output (I/O) queues of solid state nonvolatile memory 187 are found empty in step 506, and all data garbage collection processes (e.g., previously initiated erasing) are found completed with respect to the reserved (data garbage collection) storage space area of solid state nonvolatile memory 187 in step 508.

Next, in step 510 a given block of the reserved (data garbage collection) storage space is selected for writing a corresponding data image from system powered volatile memory (e.g., volatile memory 165), and the image is written from powered memory to the selected block. This selection and writing process continues as shown until all data from the system powered volatile memory is saved in step 512 in the reserved (data garbage collection) space of solid state nonvolatile memory 187. Methodology 500 then terminates when the information handling system enters the hibernation (e.g., S4) power state, and the system powered volatile memory is depowered.

Figure 8:
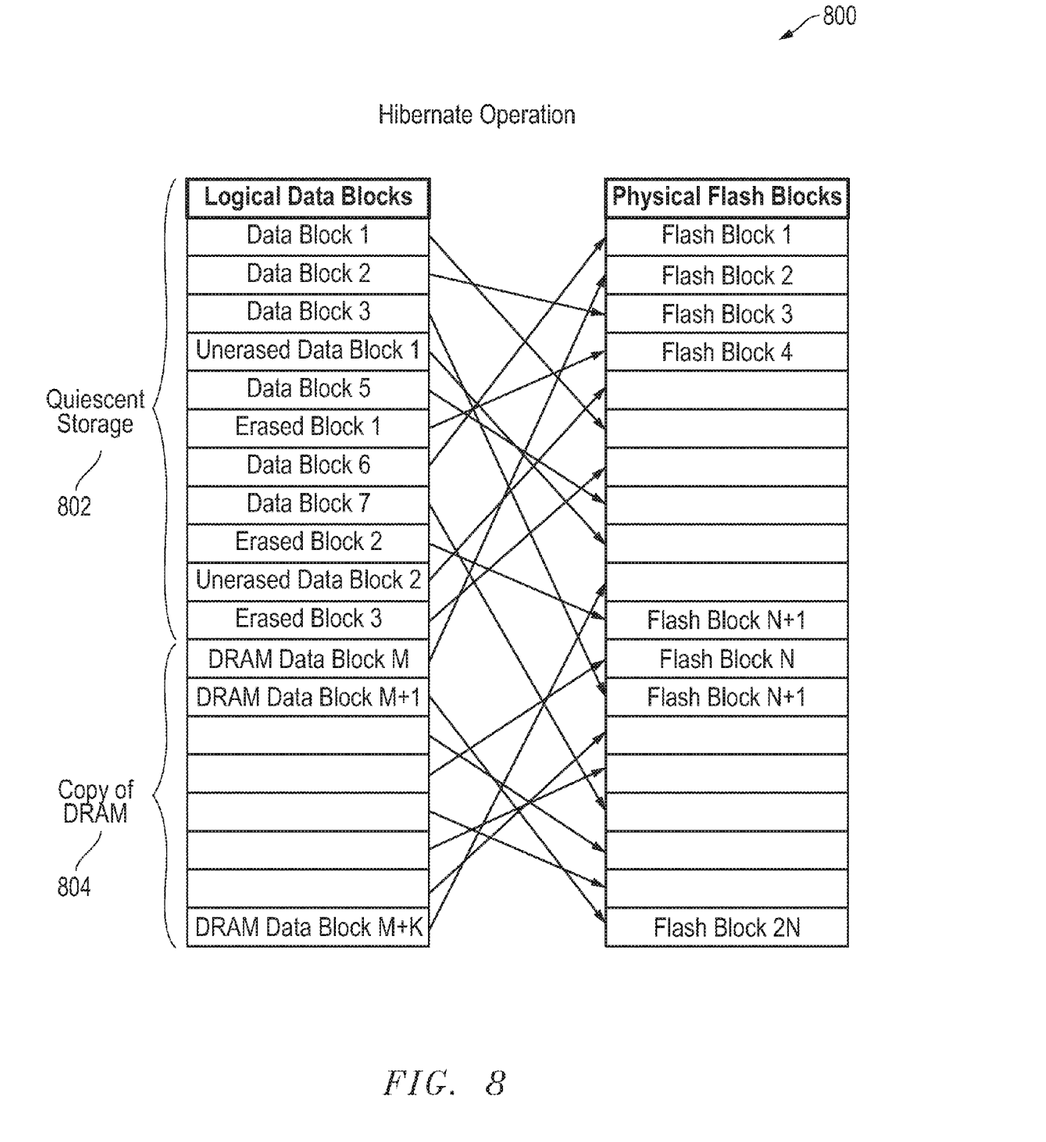
FIG. 8 illustrates a mapping relationship according to one exemplary embodiment of the disclosed systems and methods.

FIG. 8 illustrates one exemplary embodiment of a mapping relationship 800 of logical memory blocks to physical solid state nonvolatile memory blocks that may be implemented by a nonvolatile memory controller (e.g., such as nonvolatile memory controller 206) during a low power state such as hibernation (e.g., S4 power state) of an information handling system such as described above in relation to FIG. 5. As shown in FIG. 8, the same logical memory blocks previously assigned to reserved (data garbage collection) storage space 704 during the higher power working state of FIG. 7 are together with their corresponding mapped physical memory blocks now utilized (without remapping) as storage space 804 by the nonvolatile memory controller for saving a copy of working state volatile memory information 804 (e.g., read from volatile DRAM memory 165) prior to depowering the volatile memory for the low power state. As shown, the remainder of the logical memory blocks of FIG. 8 remain mapped to quiescent storage space 802 that contains data saved during the working state (e.g., S0) state of FIG. 7, although no reads or writes of this information by the OS occurs while the system is in the lower power (e.g., S4) state of FIG. 8. Although not necessary, by optionally using the same mapping of logical data blocks for both storage spaces 704 and 804, time savings may be realized for transition between higher and lower power states. In this regard, it will be understood that the nonvolatile memory controller may alternatively remap the logical blocks to at least some different physical blocks than were previously allocated for the reserve (data garbage collection) for writing the working state information from volatile memory, although this may take more time.

Restore methodology 600 of FIG. 6 may be implemented to restore working state information back to repowered volatile system memory when exiting a hibernation (e.g., S4) power state or other power state during which the system volatile memory has been depowered. As shown, methodology 600 starts in step 602 where a restore read request is received (e.g., from system BIOS executing on processor 155) upon exiting a hibernation state (e.g., S4 power state) to resume to a working state (e.g., S0 power state) for an information handling system. Methodology 600 proceeds to step 604 where a given block is read from the reserved (data garbage collection) memory space of the solid state nonvolatile memory (e.g., nonvolatile memory 187 of information handling system 150) and transferred to repowered system volatile memory (e.g., volatile memory 165 of information handling system 150). After the given block is read in step 604, it is immediately erased from solid state volatile memory in step 606 as shown. This process is repeated until all previously stored working state information (together with any data bus configuration space, such as PCIe space) is restored in step 608 from solid state nonvolatile memory to repowered system volatile memory. The resume operation of the information handling system then continues in step 610, with the reserved (data garbage collection) space of solid state nonvolatile memory being pre-erased and ready for working state operation.

Figure 9:
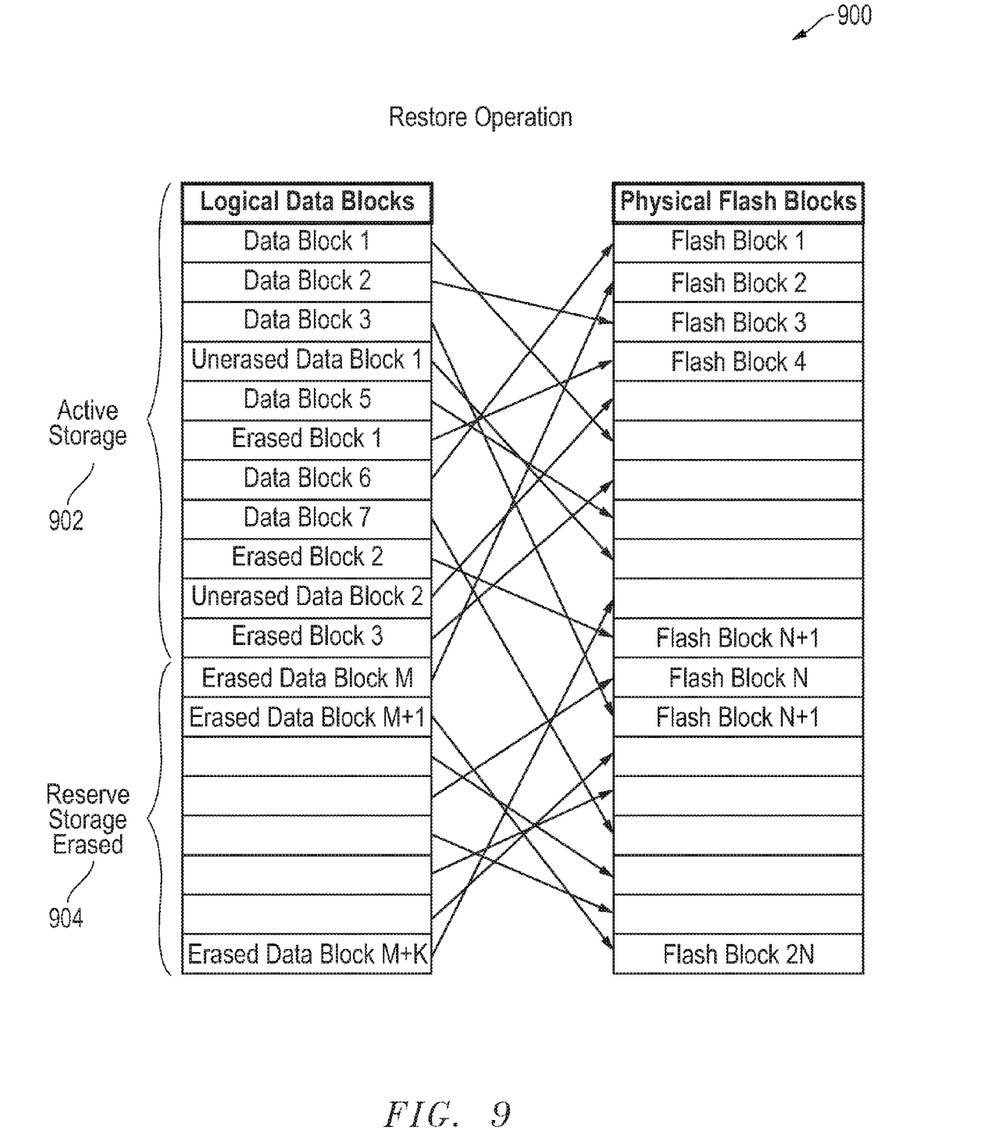
FIG. 9 illustrates a mapping relationship according to one exemplary embodiment of the disclosed systems and methods.

FIG. 9 illustrates one exemplary embodiment of a mapping relationship 900 of logical memory blocks to physical solid state nonvolatile memory blocks that may be implemented by a nonvolatile memory controller (e.g., such as nonvolatile memory controller 206) upon system restoration from hibernation (e.g., S4 power state) to working state (e.g., S0 power state) of an information handling system such as described above in relation to FIG. 6. As shown in FIG. 9, the same logical memory blocks used for saving a copy of working state volatile memory information 804 during the low power state of FIG. 8 are immediately erased and reassigned as reserved (data garbage collection) storage space 904 immediately after they are read from the reserved (data garbage collection) memory space of the solid state nonvolatile memory for transfer and writing back to repowered system volatile memory upon system restoration to the higher power working state of FIG. 9. The remainder of the logical memory blocks that were quiescent storage 802 during low power state are now assigned as shown to active available storage space 902 that is allocated for saved data and mapped to physical memory blocks that contain saved data or that are ready to contain saved data.

It will be understood that the methodologies of FIGS. 3, 4, 5 and 6 are exemplary only, and that each of these methodologies may be implemented using any combination of fewer, additional and/or alternative steps that is suitable for performing solid state nonvolatile memory operation management, hibernation storage and working state restoration operations, respectively. Moreover, it will be understood that one or more of the memory controller tasks disclosed herein may be implanted in one exemplary embodiment by user-defined commands using nonvolatile memory E PCIe flash memory standard.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

It will be understood that one or more of the tasks, functions, or methodologies described herein (e.g., including those performed by processor 155 and nonvolatile memory controller 206) may be implemented by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions are configured when executed (e.g., executed on a processing device of an information handling system such as CPU, controller, microcontroller, processor, microprocessor, FPGA, ASIC, or other suitable processing device) to perform one or more steps of the methodologies disclosed herein. A computer program of instructions may be stored in or on the non-transitory computer-readable medium residing on or accessible by an information handling system for instructing the information handling system to execute the computer program of instructions. The computer program of instructions may include an ordered listing of executable instructions for implementing logical functions in the information handling system. The executable instructions may comprise a plurality of code segments operable to instruct the information handling system to perform the methodology disclosed herein. It will also be understood that one or more steps of the present methodologies may be employed in one or more code segments of the computer program. For example, a code segment executed by the information handling system may include one or more steps of the disclosed methodologies.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A method of storing information on solid state nonvolatile memory, the method comprising:
providing an information handling system comprising:
solid state nonvolatile memory, and
volatile memory configured to only store data when power is provided to the volatile memory;
providing power to the volatile memory during a first higher power state of the information handling system;
storing system working state information in the volatile memory while the information handling system is in the first higher power state with power provided to the volatile memory;
allocating a first space of the solid state nonvolatile memory for storage of saved data and reserving a second space of the solid state nonvolatile memory for data garbage collection during the first higher power state of the information handling system, the first space of the solid state nonvolatile memory being different than the second space of the solid state nonvolatile memory;
depowering the volatile memory during a second lower power state of the information handling system with no power provided to the volatile memory; and
writing a last system working state information from the powered volatile memory to the reserved second space of the solid state nonvolatile memory for storage prior to depowering the volatile memory during the second lower power state of the information handling system in which no power is provided to the volatile memory.

2. The method of claim 1, further comprising repowering the volatile memory to restore the information handling system to the first higher power state; and reading the stored system working state information from the reserved second space of the solid state nonvolatile memory and writing the read system working state information back to the volatile memory after repowering the volatile memory to restore the last system working state information of the information handling system.

3. The method of claim 2, further comprising erasing the stored system working state information from the reserved second space of the solid state nonvolatile memory immediately after reading the stored system working state information from the reserved second space of the solid state nonvolatile memory for writing back to the repowered volatile memory.

4. The method of claim 1, where the system working state information comprises data and instructions.

5. The method of claim 1, where the first higher power state of the information handling system comprises an Advanced Configuration and Power Interface (ACPI) S0 power state; and where the second lower power state of the information handling system comprises ACPI S4 power state.

6. The method of claim 1, further comprising storing data for future recovery in the first space of the solid state nonvolatile memory allocated for storage of saved data during the first higher power state of the information handling system; and storing no data for future recovery in the second space of the solid state nonvolatile memory during the first higher power state of the information handling system.

7. The method of claim 6, further comprising erasing or pre-erasing all data contained in the second space of the solid state nonvolatile memory during the higher power working state of the information handling system.

8. The method of claim 1, where the information handling system is not configured to implement a low power state in which the volatile memory remains powered.

9. The method of claim 1, where the step of writing the system working state information from the powered volatile memory to the reserved second space of the solid state nonvolatile memory further comprises directly using the reserved second space of the solid state nonvolatile memory by writing the system working state information from the powered volatile memory to the reserved second space of the solid state nonvolatile memory without remapping logical blocks of the reserved second space to physical memory blocks of the solid state nonvolatile memory.

10. An information handling system, comprising:
solid state nonvolatile memory;
volatile memory; and
one or more processing devices configured to cause implementation of the following actions:
provide power to the volatile memory during a first higher power state of the information handling system,
store system working state information in the volatile memory while the information handling system is in the first higher power state with power provided to the volatile memory,
allocate a first space of the solid state nonvolatile memory for storage of saved data and reserve a second space of the solid state nonvolatile memory for data garbage collection during the first higher power state of the information handling system, the first space of the solid state nonvolatile memory being different than the second space of the solid state nonvolatile memory,
depower the volatile memory during a second lower power state of the information handling system, and
write a last system working state information from the powered volatile memory to the reserved second space of the solid state nonvolatile memory for storage prior to depowering the volatile memory during the second lower power state of the information handling system in which no power is provided to the volatile memory.

11. The system of claim 10, where the one or more processing devices are further configured to cause implementation of the following actions: repower the volatile memory to restore the information handling system to the first higher power state; and read the stored system working state information from the reserved second space of the solid state nonvolatile memory and write the read system working state information back to the volatile memory after repowering the volatile memory to restore the last system working state information of the information handling system.

12. The system of claim 11, where the one or more processing devices are further configured to cause implementation of the following actions: erase the stored system working state information from the reserved second space of the solid state nonvolatile memory immediately after reading the stored system working state information from the reserved second space of the solid state nonvolatile memory for writing back to the repowered volatile memory.

13. The system of claim 10, where the system working state information comprises data and instructions.

14. The system of claim 10, where the first higher power state of the information handling system comprises an Advanced Configuration and Power Interface (ACPI) S0 power state; and where the second lower power state of the information handling system comprises ACPI S4 power state.

15. The system of claim 10, where the one or more processing devices are further configured to cause implementation of the following actions: store the saved data for future recovery in the first space of the solid state nonvolatile memory allocated for storage of saved data during the first higher power state of the information handling system; and store no data for future recovery in the second space of the solid state nonvolatile memory during the first higher power state of the information handling system.

16. The system of claim 15, where the one or more processing devices are further configured to cause implementation of the following actions: erase or pre-erase all data contained in the second space of the solid state nonvolatile memory during the first higher power state of the information handling system.

17. The system of claim 10, where the information handling system is not configured to implement a low power state in which the volatile memory remains powered.

18. The system of claim 10, where the one or more processing devices are further configured to cause implementation of the following actions: directly use the reserved second space of the solid state nonvolatile memory by writing the system working state information from the powered volatile memory to the reserved second space of the solid state nonvolatile memory by writing the system working state information from the powered volatile memory to the reserved second space of the solid state nonvolatile memory without remapping logical blocks of the reserved second space to physical memory blocks of the solid state nonvolatile memory.

19. The method of claim 1, further comprising using a write restriction to prevent writing to the reserved second space of the solid state nonvolatile memory during the first higher power state; and using a reserved space write command when entering the second lower power state of the information handling system to disable the write restriction to allow writing of the last system working state information from the powered volatile memory to the reserved second space of the solid state nonvolatile memory when the information handling system is entering the second lower power state.

20. The method of claim 9, further comprising:
performing the following steps during the first higher power state of the information handling system:
assigning a first portion of logical memory blocks and their corresponding mapped physical memory blocks to the second space of the solid state nonvolatile memory reserved for data garbage collection during the first higher power state of the information handling system, assigning a second and different portion of logical memory blocks and their corresponding mapped physical memory blocks to the allocated first space of the solid state nonvolatile memory for storage of saved data during the first higher power state of the information handling system, and saving data to the allocated first space of the solid state nonvolatile memory during the first higher power state of the information handling system;

then performing the following steps when entering the second lower power state of the information handling system from the first higher power state of the information handling system and prior to depowering the volatile memory:

utilizing the first logical memory blocks of the reserved second space together with their same corresponding mapped physical memory blocks to write without remapping the last system working state information from the powered volatile memory to the previously reserved second space of the solid state nonvolatile memory when the information handling system is entering the second lower power state, and assigning the saved data stored in the allocated first space of the solid state nonvolatile memory as quiescent storage while the information handling system remains in the second lower power state; and then depowering the volatile memory during the second lower power state of the information handling system with no power provided to the volatile memory.

21. The method of claim 20, further comprising performing the following steps when entering the first higher power state of the information handling system from the second lower power state of the information handling system:

repowering the volatile memory to restore the information handling system to the first higher power state;

then reading the stored last system working state information from given physical memory blocks of the reserved second space of the solid state nonvolatile memory and writing the read system working state information back to the volatile memory after repowering the volatile memory to restore the last system working state information of the information handling system; and then immediately erasing each given physical memory block of the reserved second space of the solid state nonvolatile memory after the stored last system working state information is read from that given physical memory block;

then immediately reassigning the first portion of logical memory blocks and their corresponding mapped physical memory blocks to the second space of the solid state nonvolatile memory reserved for data garbage collection; and reassigning the allocated first space of the solid state nonvolatile memory from quiescent storage to active available storage space that is allocated for storage of saved data while the information handling system is in the first higher power state.

22. The system of claim 10, where the one or more processing devices are further configured to cause implementation of the following actions:

use a write restriction to prevent writing to the reserved second space of the solid state nonvolatile memory during the first higher power state; and use a reserved space write command when entering the second lower power state of the information handling system to disable the write restriction to allow writing of the last system working state information from the powered volatile memory to the reserved second space of the solid state nonvolatile memory when the information handling system is entering the second lower power state.

23. The system of claim 18, where the one or more processing devices are further configured to cause implementation of the following actions:

perform the following steps during the first higher power state of the information handling system:

assigning a first portion of logical memory blocks and their corresponding mapped physical memory blocks to the reserved second space of the solid state nonvolatile memory reserved for data garbage collection during the first higher power state of the information handling system, assigning a second and different portion of logical memory blocks and their corresponding mapped physical memory blocks to the allocated first space of the solid state nonvolatile memory for storage of saved data during the first higher power state of the information handling system, and saving data to the allocated first space of the solid state nonvolatile memory during the first higher power state of the information handling system; and then perform the following steps when entering the second lower power state of the information handling system from the first higher power state of the information handling system and prior to depowering the volatile memory:

utilizing the first logical memory blocks of the reserved second space together with their same corresponding mapped physical memory blocks to write without remapping the last system working state information from the powered volatile memory to the previously reserved second space of the solid state nonvolatile memory when the information handling system is entering the second lower power state, and assigning the saved data stored in the allocated first space of the solid state nonvolatile memory as quiescent storage while the information handling system remains in the second lower power state; and then depowering the volatile memory during the second lower power state of the information handling system with no power provided to the volatile memory.

24. The system of claim 23, where the one or more processing devices are further configured to cause implementation of the following actions when entering the first higher power state of the information handling system from the second lower power state of the information handling system:

repowering the volatile memory to restore the information handling system to the first higher power state;

then reading the stored last system working state information from given physical memory blocks of the reserved second space of the solid state nonvolatile memory and writing the read system working state information back to the volatile memory after repowering the volatile memory to restore the last system working state information of the information handling system; and then immediately erasing each given physical memory block of the reserved second space of the solid state nonvolatile memory after the stored last system working state information is read from that given physical memory block;

then immediately reassigning the first portion of logical memory blocks and their corresponding mapped physical memory blocks to the second space of the solid state nonvolatile memory reserved for data garbage collection; and reassigning the allocated first space of the solid state nonvolatile memory from quiescent storage to active available storage space that is allocated for storage of saved data while the information handling system is in the first higher power state.

* * * * *